US012620626B2

(12) United States Patent
Lee et al.

(10) Patent No.: US 12,620,626 B2
(45) Date of Patent: May 5, 2026

(54) LITHIUM SECONDARY BATTERY

(71) Applicant: LG Energy Solution, Ltd., Seoul (KR)

(72) Inventors: Jung Min Lee, Daejeon (KR); Jung Gu Han, Daejeon (KR); Su Hyeon Ji, Daejeon (KR); Chul Eun Yeom, Daejeon (KR); Chul Haeng Lee, Daejeon (KR); Kyung Mi Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 523 days.

(21) Appl. No.: 18/105,363

(22) Filed: Feb. 3, 2023

(65) Prior Publication Data

US 2023/0253623 A1 Aug. 10, 2023

(30) Foreign Application Priority Data

Feb. 8, 2022 (KR) ........................ 10-2022-0016541

(51) Int. Cl.

| | |
|---|---|
| ***H01M 10/0567*** | (2010.01) |
| ***H01M 4/36*** | (2006.01) |
| ***H01M 4/38*** | (2006.01) |
| ***H01M 4/48*** | (2010.01) |
| ***H01M 4/505*** | (2010.01) |
| ***H01M 4/525*** | (2010.01) |
| ***H01M 4/583*** | (2010.01) |
| ***H01M 4/587*** | (2010.01) |
| ***H01M 10/052*** | (2010.01) |
| ***H01M 10/0568*** | (2010.01) |
| ***H01M 10/0569*** | (2010.01) |
| *H01M 4/02* | (2006.01) |
| *H01M 4/86* | (2006.01) |

(52) U.S. Cl.

CPC ....... *H01M 10/0567* (2013.01); *H01M 4/362* (2013.01); *H01M 4/364* (2013.01); *H01M 4/386* (2013.01); *H01M 4/483* (2013.01); *H01M 4/505* (2013.01); *H01M 4/525* (2013.01); *H01M 4/583* (2013.01); *H01M 4/587* (2013.01); *H01M 10/052* (2013.01); *H01M 10/0568* (2013.01); *H01M 10/0569* (2013.01); *H01M 2004/027* (2013.01); *H01M 2004/028* (2013.01); *H01M 2004/8684* (2013.01); *H01M 2004/8689* (2013.01); *H01M 2300/0025* (2013.01); *H01M 2300/0028* (2013.01)

(58) Field of Classification Search

CPC .. H01M 10/0567; H01M 4/362; H01M 4/364; H01M 4/386; H01M 4/483; H01M 4/505; H01M 4/525; H01M 4/583; H01M 4/587; H01M 10/052; H01M 10/0568; H01M 10/0569; H01M 2004/027; H01M 2004/028; H01M 2004/8684; H01M 20/8689; H01M 2300/0025; H01M 2300/0028; H01M 10/0525; H01M 10/52; Y02E 60/10

See application file for complete search history.

(56) References Cited

U.S. PATENT DOCUMENTS

| | | | | |
|---|---|---|---|---|
| 9,780,358 | B2 * | 10/2017 | Masarapu | ............ H01M 4/485 |
| 10,227,493 | B2 | 3/2019 | Nakanishi et al. | |
| 11,862,764 | B2 | 1/2024 | Lee et al. | |
| 12,243,985 | B2 | 3/2025 | Lee et al. | |
| 2013/0344388 | A1 | 12/2013 | Simonin et al. | |
| 2014/0065483 | A1 | 3/2014 | Park et al. | |
| 2015/0104706 | A1 | 4/2015 | Wu et al. | |
| 2017/0263931 | A1 | 9/2017 | Wu et al. | |
| 2020/0203722 | A1 | 6/2020 | Hotta et al. | |
| 2022/0209299 | A1 | 6/2022 | Lee et al. | |
| 2023/0090340 | A1 | 3/2023 | Lee et al. | |
| 2023/0105288 | A1 | 4/2023 | Lee et al. | |
| 2024/0204250 | A1 | 6/2024 | Lee et al. | |

FOREIGN PATENT DOCUMENTS

| | | | | |
|---|---|---|---|---|
| CN | 102569889 | A | 7/2012 | |
| EP | 4318712 | A1 | 2/2024 | |
| EP | 4329038 | A1 | 2/2024 | |
| JP | H10-50344 | * | 2/1998 | ............ H01M 10/40 |
| JP | H1050344 | A | 2/1998 | |
| JP | 2000156243 | A | 6/2000 | |
| JP | 2001143748 | A | 5/2001 | |
| JP | 3680454 | B2 | 8/2005 | |
| JP | 2007012507 | A | 1/2007 | |
| JP | 4385586 | B2 | 12/2009 | |
| JP | 2012043586 | A | 3/2012 | |
| JP | 5002918 | B2 | 8/2012 | |

(Continued)

OTHER PUBLICATIONS

JP H10-50344 machine English translation (Year: 1998).*
Extended European Search Report including Written Opinion for Application No. 23753161 .1 dated Sep. 6, 2024, pp. 1-12.

*Primary Examiner* — Michael L Dignan
(74) *Attorney, Agent, or Firm* — Lerner David LLP

(57) ABSTRACT

The present disclosure relates to a lithium secondary battery comprising a positive electrode including a positive electrode active material, a negative electrode including a negative electrode active material, and a non-aqueous electrolyte. The non-aqueous electrolyte includes an organic solvent, a lithium salt, a coumarin-based compound represented by [Chemical Formula 1], and a halogen-substituted cyclic carbonate, and the positive electrode active material includes a lithium manganese-rich oxide represented by [Chemical Formula 2].

9 Claims, No Drawings

(56) References Cited

FOREIGN PATENT DOCUMENTS

| | | | |
|---|---|---|---|
| JP | 2014506387 | A | 3/2014 |
| JP | 5749116 | B2 | 7/2015 |
| JP | 2018503218 | A | 2/2018 |
| JP | 2018081742 | A | 5/2018 |
| JP | 6951307 | B2 | 10/2021 |
| JP | 2024521798 | A | 6/2024 |
| KR | 20140049650 | A | 4/2014 |
| KR | 20210060330 | A | 5/2021 |
| WO | 2021101174 | A1 | 5/2021 |

* cited by examiner

LITHIUM SECONDARY BATTERY

CROSS-REFERENCE TO RELATED APPLICATIONS

This application claims the benefit of Korean Patent Application No. 10-2022-0016541, filed on Feb. 8, 2022, in the Korean Intellectual Property Office, the disclosure of which is incorporated herein in its entirety by reference.

BACKGROUND OF THE INVENTION

The present disclosure relates to a lithium secondary battery, and more specifically, to a lithium secondary battery to which a lithium manganese-rich positive electrode active material is applied.

In recent years, interest in energy storage technology has been increased, and as the application field of the technology is expanded to mobile phones, camcorders, notebook PCs, and furthermore, to electric vehicles, efforts for research and development of electrochemical devices are gradually becoming actualized.

Among electrochemical devices, interest in the development of secondary batteries that are able to be charged and discharged is rising, and particularly, lithium secondary batteries developed in the early 1990s are in the spotlight due to having high operating voltage and a very high energy density.

A lithium secondary battery is generally manufactured by interposing a separator between a positive electrode including a positive electrode active material having a transition metal oxide containing lithium, and a negative electrode including a negative electrode active material capable of storing lithium ions, thereby providing an electrode assembly, inserting the electrode assembly into a battery case, injecting thereto a non-aqueous electrolyte, which is a medium for transferring the lithium ions, and then sealing the battery case. The non-aqueous electrolyte generally includes a lithium salt, and an organic solvent capable of dissolving the lithium salt.

Recently, as the demand for secondary batteries with high energy density, such as batteries for electric vehicles, has increased, the development of high-voltage secondary batteries driven at high voltages has been actively conducted. However, when a driving voltage is increased, electrolyte decomposition is accelerated due to structural collapse, transition metal elution, gas generation at the like on the surface of a positive electrode, and thus there is a problem in that lifespan properties of a battery are rapidly deteriorated.

In addition, in order to reduce the manufacturing cost of batteries for electric vehicles, batteries using a hyper-lithium manganese-rich (Mn-rich) positive electrode active material, which is cheaper than a typical lithium nickel-based positive electrode active material and has excellent stability, are being developed. In the case of a battery to which a hyper-lithium Mn-rich positive electrode active material is applied, it is required to perform an initial activation process at a high voltage of 4.6 V or greater, and in the activation process, active oxygen is generated, resulting in increasing side reactions and resistance with an electrolyte solution, so that there is a problem in that a positive electrode is deteriorated, thereby degrading lifespan properties.

Therefore, there is a demand for the development of a battery including a lithium manganese-rich positive electrode active material and capable of suppressing gas generation and positive electrode deterioration.

SUMMARY OF THE INVENTION

The present disclosure has been made to solve the above problems and is directed to providing a lithium secondary battery which exhibits excellent lifespan properties and swelling properties by including a coumarin-based compound and a halogenated cyclic carbonate in a non-aqueous electrolyte of a battery to which a lithium manganese-rich positive electrode active material is applied, thereby removing active oxygen generated during high-voltage activation.

According to an aspect of the present disclosure, there is provided a lithium secondary battery including a positive electrode including a positive electrode active material, a negative electrode including a negative electrode active material, and a non-aqueous electrolyte, wherein the non-aqueous electrolyte includes an organic solvent, a lithium salt, a coumarin-based compound represented by [Chemical Formula 1] below, and a halogen-substituted cyclic carbonate, and the positive electrode active material includes a lithium manganese-rich oxide represented by [Chemical Formula 2] below.

[Chemical Formula 1]

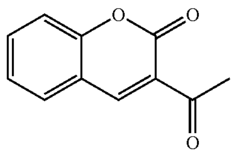

$$Li_{1+a}[Ni_bCo_cMn_dM^1_e]O_{2+a}$$ [Chemical Formula 2]

In Chemical Formula 2 above, $0.05 \leq a \leq 1$, $0 \leq b \leq 0.5$, $0 \leq c \leq 0.3$, $0.5 \leq d \leq 1.0$, and $0 \leq e \leq 0.2$, and $M^1$ is at least one selected from the group consisting of metal ions of Al, B, Co, W, Mg, V, Ti, Zn, Ga, In, Ru, Nb, Sn, Sr, and Zr.

In the present disclosure, the coumarin-based compound represented by [Chemical Formula 1] above may be included in an amount of 0.5 wt % to 3 wt % based on the total weight of the non-aqueous electrolyte, and the halogen-substituted cyclic carbonate may be included in an amount of 0.5 wt % to 10 wt % based on the total weight of the non-aqueous electrolyte.

The weight ratio of the courmarin-based compound by represented by [Chemical Formula 1]: the halogen-substituted cyclic carbonate may by 1:1~3, preferably, 1:1.2~3, more preferably, 1:1.5~2.5.

The halogen-substituted cyclic carbonate may preferably be at least one selected from the group consisting of fluorinated ethylene carbonate, trifluoroethoxyethylen carbonate and difluoroethylene carbonate.

The non-aqueous electrolyte may further include one or more additive selected from the group consisting of a cyclic carbonate-based compound, a sultone-based compound, a sulfate-based compound, a phosphate-based compound, a borate-based compound, a benzene-based compound, an amine-based compound, a silane-based compound, and a lithium salt-based compound.

Meanwhile, the lithium manganese-rich oxide may be represented by [Chemical Formula 2-1] below.

$$X\ Li_2MnO_3 \cdot (1-X)Li[Ni_{1-y-z-w}Mn_yCo_zM^1_w]O_2$$ [Chemical Formula 2-1]

In [Chemical Formula 2-1] above, $0.1 \leq X \leq 0.5$, $0.5 \leq y \leq 1$, $0 \leq z \leq 0.3$, and $0 \leq w \leq 0.2$, and $M^1$ is at least one selected from the group consisting of metal ions of Al, B, Co, W, Mg, V, Ti, Zn, Ga, In, Ru, Nb, Sn, Sr, and Zr.

Meanwhile, the negative electrode active material may include a silicon-based active material, and at this time, the silicon-based negative active material may be selected from the group consisting of Si, $SiO_m$ (wherein $0 \leq m \leq 2$), a Si—C composite, an Si-$M^a$ alloy (wherein $M^a$ is one or more selected from the group consisting of Al, Sn, Mg, Cu, Fe, Pb, Zn, Mn, Cr, Ti, and Ni), and a combination thereof.

The negative electrode active material may further include, if necessary, a carbon-based negative electrode active material, and at this time, the negative electrode active material may include the silicon-based negative electrode active material the carbon-based negative electrode active material at a weight ratio of 1:99 to 50:50.

DETAILED DESCRIPTION OF THE INVENTION

Hereinafter, the present disclosure will be described in detail.

Unless otherwise defined, the term "substituted" means that at least one hydrogen bonded to carbon is substituted with an element other than hydrogen, and for example, it means that at least one hydrogen bonded to carbon is substituted with an alkyl group having 1 to 20 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, a heterocycloalkyl group having 3 to 12 carbon atoms, a heterocycloalkenyl group having 3 to 12 carbon atoms, an aryloxy group having 6 to 12 carbon atoms, a fluoroalkyl group having 1 to 20 carbon atoms, a nitro group, an aryl group having 6 to 20 carbon atoms, a heteroaryl group having 2 to 20 carbon atoms, a haloaryl group having 6 to 20 carbon atoms, or the like.

A lithium secondary battery according to the present disclosure includes a positive electrode, a negative electrode, and a non-aqueous electrolyte, wherein the non-aqueous electrolyte includes an organic solvent, a lithium salt, a coumarin-based compound represented by [Chemical Formula 1], and a halogen-substituted cyclic carbonate, and the positive electrode includes a lithium manganese-rich oxide as a positive electrode active material.

Hereinafter, each component of the lithium secondary battery according to the present disclosure will be described in more detail.

Non-Aqueous Electrolyte

The non-aqueous electrolyte according to the present disclosure includes an organic solvent, a lithium salt, a coumarin-based compound represented by [Chemical Formula 1], and a halogen-substituted cyclic carbonate.

(1) Organic Solvent

The organic solvent may include a cyclic carbonate-based solvent, a linear carbonate-based solvent, a linear ester-based solvent, or a mixture thereof.

The cyclic carbonate-based solvent is an organic solvent with high viscosity and is an organic solvent with a high dielectric constant, thereby being capable of dissociating a lithium salt in an electrolyte solution well, and may be, for example, at least one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate. Specifically, the cyclic carbonate-based solvent may be ethylene carbonate, propylene carbonate, or a mixture thereof.

The linear carbonate-based solvent is an organic solvent having low viscosity and a low dielectric constant, and may be, for example, at least one selected from the group consisting of dimethyl carbonate (DMC), diethyl carbonate (DEC), dipropyl carbonate, ethylmethyl carbonate (EMC), methylpropyl carbonate, and ethylpropyl carbonate.

The linear ester-based solvent may be, for example, at least one selected from the group consisting of methyl acetate, ethyl acetate, propyl acetate, methyl propionate, ethyl propionate, propyl propionate, and butyl propionate.

Preferably, the organic solvent may be a mixture of a cyclic carbonate-based solvent and a linear carbonate-based solvent. At this time, the cyclic carbonate-based solvent and the linear carbonate-based solvent may be mixed at a volume ratio of 10 to 40:60 to 90, preferably 10 to 30:70 to 90, and more preferably 15 to 30:70 to 85. When the content of a cyclic carbonate-based solvent and a linear carbonate-based solvent satisfies the above range, high dielectric constant and low viscosity properties are simultaneously satisfied, and excellent ion conductivity properties may be implemented.

(2) Lithium Salt

As the lithium salt used in the present disclosure, various lithium salts commonly used in an electrolyte solution for a lithium secondary battery may be used without limitation. For example, the lithium salt may include $Li^+$ as a cation, and may include, as an anion, at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)\ 2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(FSO_2)_2N^-$, $CF_3CF_2\ (CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$.

Specifically, the lithium salt may be at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, $LiBOB(LiB(C_2O_4)_2)$, $LiCF_3SO_3$, LiTFSI $(LiN(SO_2CF_3)_2)$, $LiFSI(LiN(SO_2F)_2)$, $LiCH_3SO_3$, $LiCF_3CO_2$, $LiCH_3CO_2$, and LiBETI $(LiN(SO_2CF_2CF_3)_2$. Specifically, the lithium salt may include a single material selected from the group consisting of $LiBF_4$, $LiClO_4$, $LiPF_6$, $LiB(C_2O_4)_2$ (LiBOB), $LiCF_3SO_3$, $LiN(SO_2CF_3)_2$ (LiTFSI), $(LiN(SO_2F)_2$ (LiFSI), and $LiN(SO_2CF_2CF_3)_2$ (LiBETI), or a mixture of two or more thereof.

The lithium salt may be included in the electrolyte solution at a concentration of 0.8 M to 4 M, preferably 0.8 M to 2 M, and more preferably 0.8 M to 1.6 M. When the concentration of a lithium salt satisfies the above range, the $Li^+$ transference number and the degree of dissociation of lithium ions may be improved, so that the output properties of a battery may be improved.

(3) Coumarin-Based Compound

The non-aqueous electrolyte according to the present disclosure includes a coumarin-based compound represented by [Chemical Formula 1] below.

[Chemical Formula 1]

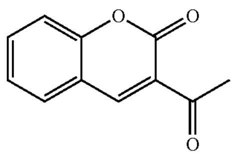

Since the coumarin-based compound represented by [Chemical Formula 1] above has higher reaction energy with active oxygen than an organic solvent such as ethylene carbonate, the coumarin-based compound is bonded to active oxygen before the organic solvent is bonded thereto when the active oxygen is generated. Therefore, when the coumarin-based compound of Chemical Formula 1 is included in the non-aqueous electrolyte solution, active oxygen generated in an initial activation step of a high-voltage battery may be scavenged by the coumarin-based compound to suppress the decomposition of an organic solvent due to the active oxygen, and accordingly, the generation of gases or the generation of resistor byproducts caused by the decomposition of the organic solvent may be reduced to a minimum.

In addition, the coumarin-based compound of Chemical Formula 1 includes an acetyl group, thereby forming an SEI film on the surface of a positive electrode and/or a negative electrode, so that direct contact between the electrode and an electrolyte solution may be suppressed to obtain effects of reducing gas generation and swelling at high temperatures and improving lifespan.

Meanwhile, the coumarin-based compound of Chemical Formula 1 above may be included in an amount of 0.5 wt % to 3 wt %, preferably 0.5 wt % to 2 wt %, and more preferably 0.5 to 1 wt %, based on the total weight of the non-aqueous electrolyte. When the content of the coumarin-based compound satisfies the above range, a robust SEI film may be formed on a positive electrode and a negative electrode, and an oxygen radical compound generated from the positive electrode may be effectively removed to assist in improving battery performance. When the content of the coumarin-based compound is too high, resistance may increase to adversely affect the battery performance.

(4) Halogen-Substituted Cyclic Carbonate

The non-aqueous electrolyte according to the present disclosure includes a halogen-substituted carbonate-based compound.

The halogen-substituted carbonate-based compound may be, for example, at least one selected from group consisting of fluoroethylene carbonate (FEC), trifluoroethoxyethylen carbonate (TFEEC, CAS No. 2071177-76-7), and difluoroethylene carbonate(DFEC, CAS No. 311810-76-1). Preferably the halogen-substituted carbonate-based compound may be fluoroethylene carbonate.

When the halogen-substituted carbonate-based compound is included in the electrolyte, oxidation stability of an electrolyte solution increases, so that an effect of improving high voltages may be obtained, and an SEI film is formed on the surface of a positive electrode, thereby stabilizing a positive electrode interface, so that an effect of improving long lifespan properties may be obtained. However, when halogen substituted carbonate-based compounds are used alone, oxidation decomposition reaction occurs excessively at the anode interface, and LiF components and the like are deposited on the anode surface, causing an increase in resistance, $CO_2$ gas generation and HF generation side reactions increase, thereby accelerating the electrolyte decomposition reaction. However, as in the present disclosure, when a halogen-substituted carbonate-based compound and a coumarin-based compound are used together, due to a positive electrode film formation mechanism of the coumarin-based compound, a positive electrode oxidation reaction of the halogen-substituted carbonate-based compound is suppressed, so that the above side effect may be reduced to a minimum.

The halogen-substituted carbonate-based compound may be included in an amount of 0.5 wt % to 10 wt %, preferably 0.5 wt % to 8 wt %, more preferably 1 wt % to 5 wt %, and even more preferably 1 wt % to 3 wt %, based on the total weight of the non-aqueous electrolyte. When the content of the halogen-substituted carbonate-based compound satisfies the above range, effects of improving high-voltage performance due to an increase in the oxidation stability of an electrolyte and improving lifespan properties due to the formation of an SEI film may be obtained.

The coumarin-based compound and the halogen-substituted carbonate-based compound may be included in weight ratio of 1:1~3, preferably 1:1.2~3, more preferably 1:1.5~2.5. When the weight ratio of the coumarin-based compound and the halogen-substituted cyclic carbonate satisfies the above range, swelling characteristics and high-temperature storage characteristics are more excellent. In particular, when the content of the halogen-substituted cyclic carbonate is 1.5 to 2.5 times the content of the coumarin-based compound represented by [Formula 1], the effect of suppressing the increase in cell volume after the activation process and storage at high temperature and the effect of improving the capacity retention rate after storage at high temperature are most excellent.

(5) Other Additives

Meanwhile, the non-aqueous electrolyte according to the present disclosure may additionally include, although not required, other additives in addition to the above components in order to further improve the physical properties of the secondary battery.

Examples of the other additives may include at least one selected from the group consisting of a cyclic carbonate-based compound, a sultone-based compound, a sulfate-based compound, a phosphate-based compound, a borate-based compound, a benzene-based compound, an amine-based compound, a silane-based compound, and a lithium salt-based compound.

The cyclic carbonate-based compound may be, for example, vinylene carbonate (VC), vinylethylene carbonate (VEC), or the like.

The sultone-based compound may be, for example, 1,3-propanesultone, 1,3-profensultone, or the like.

The sulfate-based compound may be, for example, ethylene sulfate (ESA), trimethylene sulfate (TMS), methyl trimethylene sulfate (MTMS), or the like.

The phosphate-based compound may be, for example, one or more compounds selected from the group consisting of lithium difluoro(bisoxalato)phosphate, lithium difluorophosphate, tetramethyl trimethyl silyl phosphate, trimethyl silyl phosphite, tris(2,2,2-trifluoroethyl)phosphate, and tris (trifluoroethyl)phosphite.

The borate-based compound may be, for example, tetraphenylborate, lithium oxalyldifluoroborate (LiODFB), or the like.

The benzene-based compound may be, for example, fluorobenzene or the like, the amine-based compound may be triethanolamine, ethylenediamine, or the like, and the silane-based compound may be tetravinylsilane or the like.

The lithium salt-based compound is a compound different from the lithium salt included in the non-aqueous electrolyte solution, and may be one or more compounds selected from the group consisting of $LiPO_2F_2$, LiODFB, lithium bisoxalatoborate ($LiB(C_2O_4)_2$) (LiBOB), and $LiBF_4$.

Meanwhile, the additives may be used alone, or two or more thereof may be mixed and used.

The total amount of the additive may be 0.1 wt % to 20 wt %, preferably 0.1 wt % to 15 wt % based on the total weight of the electrolyte solution. When the additive is included in the above range, it is possible to stably form a film on the electrode, suppress an ignition phenomenon during overcharging, and prevent side reactions from occurring or the additive from remaining or being precipitated during an initial activation process of a secondary battery.

Positive Electrode

The positive electrode according to the present disclosure may include a positive electrode active material layer including a positive electrode active material, and if necessary, the positive electrode active material layer may further include a conductive material and/or a binder.

The positive electrode active material may include 50 mol % or greater of Mn among all metals excluding lithium, and may include a lithium manganese-rich oxide in which the molar ratio of lithium to a transition metal is greater than 1.

Specifically, a lithium manganese-rich oxide has a structure in which a layered phase ($LMO_2$) and a rock salt phase ($Li_2MnO_3$) are mixed in a positive electrode active material, wherein a lithium manganese oxide in the rock salt phase is decomposed during an initial activation process, thereby generating lithium, so that high-capacity properties may be implemented. However, to this end, the initial activation process must be performed at a high voltage of 4.6 V or higher, and active oxygen is generated in the process of decomposing the lithium manganese oxide in the rock salt phase. The active oxygen attacks and decomposes an organic solvent such as ethylene carbonate, and generates gases and resistor byproducts, thereby degrading battery physical properties. However, in the present disclosure, a non-aqueous electrolyte includes a coumarin-based compound having higher reactivity with active oxygen than an organic solvent, so that active oxygen generated in an initial activation process may be bonded to the coumarin-based compound before the organic solvent, which may minimize side effects caused by decomposition of the organic solvent.

Specifically, the lithium manganese-rich oxide may be represented by Chemical Formula 2 below.

$$Li_{1+a}[Ni_bCo_cMn_dM^1_e]O_{2+a} \quad \text{[Chemical Formula 2]}$$

In Chemical Formula 2 above, it may be that $0.05 \leq a \leq 1$, $0 \leq b \leq 0.5$, $0 \leq c \leq 0.3$, $0.5 \leq d < 1.0$, and $0 \leq e \leq 0.2$, preferably $0.05 \leq a \leq 1.0$, $0.1 \leq b \leq 0.5$, $0 \leq c \leq 0.1$, $0.5 \leq d < 1.0$, $0 \leq e \leq 0.2$, and $-1.0 \leq f \leq 1.0$, and more preferably $0.10 \leq a \leq 0.50$, $0.1 \leq b \leq 0.5$, $0 \leq c \leq 0.1$, $0.6 \leq d < 1.0$, and $0 \leq e \leq 0.1$.

In addition, $M^1$ may be at least one selected from the group consisting of metal ions of Al, B, Co, W, Mg, V, Ti, Zn, Ga, In, Ru, Nb, Sn, Sr, and Zr.

More specifically, the lithium manganese-rich oxide may be represented by [Chemical Formula 2-1] below.

$$X\ Li_2MnO_3 \cdot (1-X)Li[Ni_{1-y-z-w}Mn_yCo_zM^1_w]O_2 \quad \text{[Chemical Formula 2-1]}$$

In [Chemical Formula 2-1] above, it may be that $0.1 \leq X \leq 0.5$, $0.5 \leq y \leq 1$, $0 \leq z \leq 0.3$, and $0 \leq w \leq 0.2$, preferably $0.2 \leq X \leq 0.5$, $0.5 \leq y \leq 1$, $0 \leq z \leq 0.1$, and $0 \leq w \leq 0.2$, and more preferably $0.3 \leq X \leq 0.5$, $0.6 \leq y \leq 1$, $0 \leq z \leq 0.1$, and $0 \leq w\ 0.2$.

In addition, $M^1$ may be at least one selected from the group consisting of metal ions of Al, B, Co, W, Mg, V, Ti, Zn, Ga, In, Ru, Nb, Sn, Sr, and Zr.

The lithium manganese-rich oxide may be prepared by mixing a transition metal precursor and a lithium raw material, and then firing the mixture. At this time, the transition metal precursor and the lithium raw material may be mixed in an amount such that the molar ratio of the total transition metals (Ni+Co+Mn):Li is 1:1.05 to 1:2, the firing temperature may be 600° C. to 1000° C., the firing time may be 5 hours to 30 hours, and the firing atmosphere may be an atmospheric atmosphere or an oxygen atmosphere, for example, an atmosphere containing 20 vol % to 100 vol % of oxygen.

The lithium raw material may be, for example, a carbonate (for example, lithium carbonate and the like), a hydrate (for example, lithium hydroxide hydrate ($LiOH \cdot H_2O$) and the like), a hydroxide (for example, lithium hydroxide and the like), a nitrate (for example, lithium nitrate ($LiNO_3$) and the like) and a chloride (for example, lithium chloride (LiCl) and the like), and the like, all containing lithium, and any one thereof or a mixture of two or more thereof may be used.

Meanwhile, the transition metal precursor may be in the form of a hydroxide, an oxide or a carbonate. When using a precursor in the form of a carbonate, it is more preferable in that a positive electrode active material having a relatively high specific surface area may be prepared.

The transition metal precursor may be prepared through a co-precipitation process. For example, the transition metal precursor may be prepared by dissolving each transition metal-containing raw material in a solvent to prepare a metal solution, mixing the metal solution, an ammonium cation complex forming agent, and a basic compound, and then performing a co-precipitation reaction. In addition, if necessary, an oxidization agent or an oxygen gas may be further introduced during the co-precipitation reaction.

At this time, the transition metal-containing raw material may be an acetate, carbonate, nitrate, sulfate, halide, sulfide, or the like of each transition metal. Specifically, the transition metal-containing raw material may be NiO, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, $Mn_2O_3$, $MnO_2$, $Mn_3O_4$ $MnCO_3$, $Mn(NO_3)_2$, $MnSO_4 \cdot H_2O$, acetic acid manganese, manganese halide, cobalt oxide, cobalt acetate, cobalt halide, and the like.

The ammonium cation complex forming agent may be at least one selected from the group consisting of $NH_4OH$, $(NH_4)_2SO_4$, $NH_4NO_3$, $NH_4Cl$, $CH_3COONH_4$, and $(NH_4)_2CO_3$.

The basic compound may be at least one selected from the group consisting of NaOH, $Na_2CO_3$, KOH, and $Ca(OH)_2$. Depending on the type of a basic compound used, the form of a precursor may vary. For example, when NaOH is used as a basic compound, a precursor in the form of a hydroxide may be obtained, and when $Na_2CO_3$ is used as a basic compound, a precursor in the form of a carbonate may be obtained. In addition, when a basic compound and an oxidization agent are used together, a precursor in the form of an oxide may be obtained.

Meanwhile, the positive electrode active material according to the present disclosure may be in the form of a secondary particle in which a plurality of primary particles are aggregated, and the secondary particle may have an average particle diameter $D_{50}$ of 2 μm to 10 μm, preferably 2 μm to 8 μm, and more preferably 4 μm to 8 μm.

In addition, the positive electrode active material may have a BET specific surface area of 1 $m^2/g$ or greater, 3 $m^2/g$ to 8 $m^2/g$, or 4 $m^2/g$ to 6 $m^2/g$.

In addition, the positive electrode active material according to the present disclosure may have an initial irreversible capacity of 5% to 70%, 5% to 50%, or 10% to 30%. When the initial irreversible capacity of a positive electrode active material satisfies the above range, and when a negative electrode including a silicon-based negative electrode active material having a large irreversible capacity is used, balance with the negative electrode is properly maintained, so that degradation in battery properties due to capacity imbalance between a positive electrode and a negative electrode may be reduced to a minimum.

Meanwhile, examples of the conductive material may include, for example, spherical or flaky graphite, natural graphite or artificial graphite; a carbon-based material such as carbon black, acetylene black, Ketjen black, channel black, furnace black, lamp black, summer black, carbon fiber, single-walled carbon nanotubes, or multi-walled carbon nanotubes, metal powder or metal fiber of such as copper, nickel, aluminum, or silver, a conductive whisker such as a zinc oxide whisker or a potassium titanate whisker, a conductive metal oxide such as a titanium oxide, a conductive polymer such as a polyphenylene derivative, and the like, and any one thereof or a mixture of two or more thereof may be used. The conductive material may be included in an amount of 0.1 wt % to 20 wt %, 1 wt % to 20 wt %, or 1 wt % to 10 wt % based on the total weight of the positive electrode active material layer.

In addition, examples of the binder may include, for example, polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM) rubber, a sulfonated-EPDM, styrene butadiene rubber (SBR), fluorine rubber, or various copolymers thereof, and any one thereof or a mixture of two or more thereof may be used. The binder may be included in an amount of 1 wt % to 20 wt %, 2 wt % to 20 wt %, or 2 wt % to 10 wt % based on the total weight of the positive electrode active material layer.

The positive electrode of the present disclosure as described above may be manufactured by a method for manufacturing a positive electrode known in the art. For example, the positive electrode may be manufactured by preparing a positive electrode slurry by dissolving or dispersing a positive electrode active material, a binder and/or a conductive material in a solvent and applying the positive electrode slurry on a positive electrode current collector, followed by drying and roll-pressing, or by casting the positive electrode slurry on a separate support, and then laminating, on a positive electrode current collector, a film obtained by peeling off the support.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 to 500 μm, and microscopic irregularities may be formed on the surface of the current collector to improve adhesion with respect to the positive electrode active material layer. For example, the positive electrode current collector may be used in various forms such as a film, a sheet, a foil, a net, a porous body, a foam, and a non-woven body.

The solvent may be a solvent commonly used in the art. Examples of the solvent may include dimethyl sulfoxide (DMSO), isopropyl alcohol, N-methylpyrrolidone (NMP), acetone, water, or the like, and any one thereof or a mixture of two or more thereof may be used. The amount of the solvent to be used is not particularly limited as long as it may be adjusted such that a positive electrode mixture material has an appropriate viscosity in consideration of the applying thickness, preparation yield, workability, and the like of the positive electrode mixture material.

Negative Electrode

The negative electrode according to the present disclosure includes a negative electrode active material layer including a negative electrode active material, and the negative electrode active material layer may include, if necessary, a conductive material and/or a binder.

As the negative electrode active material, various negative electrode active materials used in the art, for example, a silicon-based negative electrode active material, a carbon-based negative electrode active material, a metal alloy, or the like may be used.

Preferably, the negative electrode active material includes a silicon-based negative electrode active material.

For example, the silicon-based negative active material may be selected from the group consisting of Si, $SiO_m$ (wherein $0 \le m \le 2$), a Si—C composite, an Si-$M^a$ alloy (wherein $M^a$ is one or more selected from the group consisting of Al, Sn, Mg, Cu, Fe, Pb, Zn, Mn, Cr, Ti, and Ni), and a combination thereof.

In addition, the silicon-based negative electrode active material may be doped with an $M^b$ metal, and at this time, the $M^b$ metal may be a Group 1 alkali metal element and/or a Group 2 alkaline earth metal element, for example, Li, Mg, and the like. Specifically, the silicon-based negative electrode active material may be Si, $SiO_m$ (wherein, $0 \le m \le 2$), a Si—C composite, and the like doped with an $M^b$ metal. In the case of a metal-doped silicon-based negative electrode active material, the active material capacity is reduced due to a doping element, but the efficiency is high, so that high energy density may be implemented.

In addition, the silicon-based negative electrode active material may further include a carbon coating layer on the surface of a particle. Here, the carbon coating amount may be 20 wt % or less, preferably 0.1 wt % to 20 wt %, based on the total weight of the silicon-based negative electrode active material. The carbon coating layer may be formed by dry coating, wet coating, chemical vapor deposition (CVD), physical vapor deposition (PVD), atomic layer deposition (ALD), or the like.

In addition, the silicon-based negative electrode active material particle may have a particle size $D_{50}$ of 3 um to 8 um, preferably 4 um to 7 um, and a $D_{min}$ to $D_{max}$ of 0.5 um to 30 um, preferably 0.5 um to 20 um, and more preferably 1 um to 15 um.

In addition, the negative electrode may further include, if necessary, a carbon-based negative electrode active material as the negative electrode active material. The carbon-based negative electrode active material may be, for example, artificial graphite, natural graphite, graphitized carbon fiber, amorphous carbon, soft carbon, hard carbon, or the like, but is not limited thereto.

Meanwhile, the silicon-based negative electrode active material may be included in an amount of 1 wt % to 100 wt %, 1 wt % to 50 wt %, 1 wt % to 30 wt %, 1 wt % to 15 wt %, 10 wt % to 70 wt %, or 10 wt % to 50 wt % based on the total weight of the negative electrode active material.

The carbon-based negative electrode active material may be included in an amount of 0 wt % to 99 wt %, 50 wt % to 99 wt %, 70 wt % to 99 wt %, 85 wt % to 99 wt %, 30 wt % to 90 wt %, or 50 wt % to 90 wt % based on the total weight of the negative electrode active material.

According to one embodiment, the negative electrode active material may be a mixture of a silicon-based negative electrode active material and a carbon-based negative electrode active material, and at this time, the mixing ratio of the silicon-based negative electrode active material and the carbon-based negative electrode active material may be 1:99 to 50:50, preferably 3:97 to 30:70 in a weight ratio. When the mixing ratio of the silicon-based negative electrode active material and the carbon-based negative electrode active material satisfies the above range, the volume expansion of the silicon-based negative electrode active material is suppressed while the capacity properties are improved, so that it is possible to ensure excellent cycle performance.

The negative electrode active material may be included in an amount of 80 wt % to 99 wt % based on the total weight of the negative electrode active material layer. When the content of the negative electrode active material satisfies the above range, excellent capacity properties and electrochemical properties may be obtained.

Examples of the conductive material may include, for example, spherical or flaky graphite, natural graphite or artificial graphite; a carbon-based material such as carbon black, acetylene black, Ketjen black, channel black, furnace black, lamp black, summer black, carbon fiber, single-walled carbon nanotubes, or multi-walled carbon nanotubes, metal powder or metal fiber of such as copper, nickel, aluminum, or silver, a conductive whisker such as a zinc oxide whisker or a potassium titanate whisker, a conductive metal oxide such as a titanium oxide, a conductive polymer such as a polyphenylene derivative, and the like, and any one thereof or a mixture of two or more thereof may be used. The conductive material may be included in an amount of 0.1 wt % to 30 wt %, 1 wt % to 20 wt %, or 1 wt % to 10 wt % based on the total weight of the negative electrode active material layer.

Preferably, single-walled carbon nanotubes may be used as the conductive material. When the single-walled carbon nanotubes are used as the conductive material, a conductive path is evenly formed on the surface of the negative electrode active material, and as a result, an effect of improving cycle properties may be obtained.

Examples of the binder may include, for example, polyvinylidene fluoride (PVDF), a polyvinylidene fluoride-hexafluoropropylene copolymer (PVDF-co-HFP), polyvinyl alcohol, polyacrylic acid, polyacrylamide, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM) rubber, a sulfonated-EPDM, styrene butadiene rubber (SBR), fluorine rubber, or various copolymers thereof, and any one thereof or a mixture of two or more thereof may be used. The binder may be included in an amount of 1 wt % to 20 wt %, 2 wt % to 20 wt %, or 2 wt % to 10 wt % based on the total weight of the negative electrode active material layer.

In the negative electrode, the negative electrode active material layer may have a single layer or have a multi-layered structure composed of two or more layers. When the negative electrode active material layer has the multi-layered structure composed of two or more layers, each layer may have different types and/or contents of a negative electrode active material, a binder, and/or a conductive material. For example, in the negative electrode according to the present disclosure, the content of the carbon-based negative electrode active material in a lower layer may be formed to be higher than that in an upper layer, and the content of the silicon-based negative electrode active material may be formed to be high in the upper layer, and in this case, compared to a case in which the negative electrode active material layer is formed as a single layer, an effect of improving rapid charging performance may be obtained.

The negative electrode active material layer may have a porosity of 20% to 70% or 20% to 50%.

The negative electrode may be manufactured by a method for manufacturing a negative electrode known in the art. For example, the negative electrode may be manufactured by preparing a negative electrode slurry by dissolving or dispersing a negative electrode active material, and selectively a binder and a conductive material, in a solvent, and applying, roll-pressing, and then drying the negative electrode slurry on a negative electrode current collector, or by casting the negative electrode slurry on a separate support, and then laminating a film obtained by peeling off the support on a negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The solvent may be a solvent commonly used in the art, and may be dimethyl sulfoxide (DMSO), isopropyl alcohol, N-methylpyrrolidone (NMP), acetone, water, or the like, and any one thereof or a mixture of two or more thereof may be used. The amount of the solvent to be used is not particularly limited as long as it may be adjusted such that a negative electrode slurry has an appropriate viscosity in consideration of the applying thickness, preparation yield, workability, and the like of a negative electrode mixture material.

Separator

Meanwhile, the lithium secondary battery according to the present disclosure may include, if necessary, a separator between the positive electrode and the negative electrode. The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and selectively, may be used in a single-layered or a multi-layered structure.

The lithium secondary battery according to the present disclosure as described above may be usefully used in portable devices such as mobile phones, laptop computers, and digital cameras, in electric cars such as a hybrid electric vehicle (HEV), and the like.

Accordingly, according to another embodiment of the present disclosure, a battery module including the lithium secondary battery as a unit cell, and a battery pack including the battery module are provided.

The battery module or the battery pack may be used as a power source of one or more medium-and-large-sized devices such as a power tool, an electric car such as an electric vehicle (EV), a hybrid electric vehicle (HEV), and a plug-in hybrid electric vehicle (PHEV), and a power storage system.

The external shape of the lithium secondary battery of the present disclosure is not particularly limited, but may be a cylindrical shape using a can, a square shape, a pouch shape, a coin shape, or the like.

The lithium secondary battery according to the present disclosure may be used in a battery cell which is used as a power source for a small-sized device, and may also be preferably used as a unit cell for a medium- and large-sized battery module including a plurality of battery cells.

Hereinafter, the present disclosure will be described in detail with reference to exemplary embodiments.

Example 1

(Preparation of Non-Aqueous Electrolyte)

$LiPF_6$ was dissolved to a concentration of 1.2 M in a non-aqueous organic solvent in which ethylene carbonate (EC):ethyl methyl carbonate (EMC):diethyl carbonate were mixed at a volume ratio of 20:60:20, and then 0.5 wt % of a coumarin-based compound of Chemical Formula 1, 3 wt % of fluorinated ethylene carbonate (FEC), 0.5 wt % of vinylene carbonate (VC), 0.5 wt % of propane sultone (PS), 1 wt % of ethylene sulfate (Esa), 0.5 wt % of $LiBF_4$, and 1 wt % of lithium difluorophosphate (LiDFP) were added thereto to prepare a non-aqueous electrolyte A.

(Manufacturing of Positive Electrode)

A lithium manganese-based oxide $Li_{1.3}$ $(Ni_{0.35}Mn_{0.65})$ $O_{2.33}$ as a positive electrode active material, carbon black as a conductive material, and polyvinylidene fluoride (PVDF) as a binder were added to N-methyl-2-pyrrolidone (NMP) as a solvent at a weight ratio of 96:1:3 to prepare a positive electrode active material slurry (solid content 48 wt %). The positive electrode active material slurry was applied on a positive electrode current collector (an Al thin film), dried, and the roll-pressed to manufacture a positive electrode.

(Manufacturing of Negative Electrode Electrode)

A negative electrode active material (artificial graphite: $SiO_m$=94.5:5.5 weight ratio), PVDF as a binder, and carbon black as a conductive material were added to NMP as a solvent at a weight ratio of 95:2:3 to prepare a negative electrode active material slurry (solid content: 70 wt %). The negative electrode active material slurry was applied on a negative electrode current collector (a Cu thin film), dried, and the roll-pressed to manufacture a negative electrode.

(Manufacturing of Lithium Secondary Battery)

The positive electrode and the negative electrode manufactured above were sequentially stacked with a polyethylene porous film to manufacture an electrode assembly according to a typical method, and then the electrode assembly was accommodated in a pouch-type secondary battery case, and the non-aqueous electrolyte A prepared above was injected into the case to manufacture a lithium secondary battery.

Example 2

A non-aqueous electrolyte B was prepared in the same manner as in Example 1, except that 1 wt % of the coumarin-based compound of Chemical Formula 1 was added.

In addition, a lithium secondary battery was manufactured in the same manner as in Example 1, except that the non-aqueous electrolyte B was used.

Example 3

A non-aqueous electrolyte C was prepared in the same manner as in Example 1, except that 2 wt % of the coumarin-based compound of Chemical Formula 1 was added.

In addition, a lithium secondary battery was manufactured in the same manner as in Example 1, except that the non-aqueous electrolyte C was used.

Example 4

A non-aqueous electrolyte D was prepared in the same manner as in Example 1, except that 3 wt % of the coumarin-based compound of Chemical Formula 1 was added.

In addition, a lithium secondary battery was manufactured in the same manner as in Example 1, except that the non-aqueous electrolyte D was used.

Example 5

A non-aqueous electrolyte E was prepared in the same manner as in Example 1, except that 1 wt % of fluorinated ethylene carbonate (FEC) was added.

In addition, a lithium secondary battery was manufactured in the same manner as in Example 1, except that the non-aqueous electrolyte E was used.

Example 6

A non-aqueous electrolyte F was prepared in the same manner as in Example 1, except that 5 wt % of fluorinated ethylene carbonate (FEC) was added.

In addition, a lithium secondary battery was manufactured in the same manner as in Example 1, except that the non-aqueous electrolyte F was used.

Comparative Example 1

A non-aqueous electrolyte G was prepared in the same manner as in Example 1, except that the coumarin-based compound of Chemical Formula 1 was not added.

In addition, a lithium secondary battery was manufactured in the same manner as in Example 1, except that the non-aqueous electrolyte G was used.

Comparative Example 2

A non-aqueous electrolyte H was prepared in the same manner as in Example 1, except that fluorinated ethylene carbonate (FEC) was not added.

In addition, a lithium secondary battery was manufactured in the same manner as in Example 1, except that the non-aqueous electrolyte H was used.

Comparative Example 3

A non-aqueous electrolyte I was prepared in the same manner as in Example 1, except that an unsubstituted coumarin-based compound represented by Chemical Formula A, instead of the coumarin-based compound of Chemical Formula 1, was added.

<Chemical Formula A>

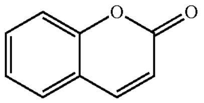

In addition, a lithium secondary battery was manufactured in the same manner as in Example 1, except that the non-aqueous electrolyte I was used.

Comparative Example 4

A lithium secondary battery was manufactured in the same manner as in Comparative Example 1, except that $LiNi_{0.8}Co_{0.1}Mn_{0.1}O_2$, instead of the lithium manganese-based oxide, was used as the positive electrode active material when manufacturing of the positive electrode.

Comparative Example 5

A lithium secondary battery was manufactured in the same manner as in Example 1, except that $LiNi_{0.8}Co_{0.1}Mn_{0.1}O_2$, instead of the lithium manganese-based oxide, was used as the positive electrode active material when manufacturing of the positive electrode.

TABLE 1

| | Type of Coumarin compound | Coumarin content (wt %) | FEC content (wt %) | Type of positive electrode active material |
|---|---|---|---|---|
| Example 1 | Chemical Formula 1 | 0.5 | 3 | $Li_{1.3}(Ni_{0.35}Mn_{0.65})O_{2.33}$ |
| Example 2 | Chemical Formula 1 | 1 | 3 | $Li_{1.3}(Ni_{0.35}Mn_{0.65})O_{2.33}$ |
| Example 3 | Chemical Formula 1 | 2 | 3 | $Li_{1.3}(Ni_{0.35}Mn_{0.65})O_{2.33}$ |
| Example 4 | Chemical Formula 1 | 3 | 3 | $Li_{1.3}(Ni_{0.35}Mn_{0.65})O_{2.33}$ |
| Example 5 | Chemical Formula 1 | 0.5 | 1 | $Li_{1.3}(Ni_{0.35}Mn_{0.65})O_{2.33}$ |
| Example 6 | Chemical Formula 1 | 0.5 | 5 | $Li_{1.3}(Ni_{0.35}Mn_{0.65})O_{2.33}$ |
| Comparative Example 1 | — | — | 3 | $Li_{1.3}(Ni_{0.35}Mn_{0.65})O_{2.33}$ |
| Comparative Example 2 | Chemical Formula 1 | 0.5 | — | $Li_{1.3}(Ni_{0.35}Mn_{0.65})O_{2.33}$ |
| Comparative Example 3 | Chemical Formula A | 0.5 | 3 | $Li_{1.3}(Ni_{0.35}Mn_{0.65})O_{2.33}$ |
| Comparative Example 4 | — | — | 3 | $LiNi_{0.8}Co_{0.1}Mn_{0.0.1}O_2$ |
| Comparative Example 5 | Chemical Formula 1 | 0.5 | 3 | $LiNi_{0.8}Co_{0.1}Mn_{0.0.1}O_2$ |

Experimental Example 1

A pre-aging step of storing each of the lithium secondary batteries prepared by Examples 1~6 and Comparative examples 1~3 at room temperature for 2 days was performed such that the electrolyte was sufficiently wetted. Then, the lithium secondary batteries were charged up to SOC 3% with 0.2 C under a pressure of 0.5 $kgf/cm^2$ at 45° C., then charged up to SOC 17% with 0.3 C under the same temperature and pressure conditions, and then charged up to SOC 30% with 0.3 C under a pressure of 5 $kgf/cm^2$. Then, film stabilization and gas discharge processes were performed while performing high-temperature aging at 60° C. for 15 hours.

Next, charging was performed to 4.6 V with 0.3 C under a pressure of 5 $kgf/cm^2$ at 45° C. to perform a positive electrode activation process, and then discharging was performed to 2 V with 0.5 V to complete the activation process.

Meanwhile, cell volume increase rates during the activation process was calculated according to Equation (1) below by measuring the volume of each of the lithium secondary battery cells at room temperature in a buoyant manner before and after performing the activation process.

$$\text{Cell volume change rate (\%)}=\{(\text{volume after positive electrode activation process}-\text{initial cell volume})/\text{initial cell volume}\}\times 100 \quad \text{Equation (1)}$$

The measurement results are shown in [Table 2] below.

TABLE 2

| | Cell volume increase rate (%) before and after activation process |
|---|---|
| Example 1 | 121.6% |
| Example 2 | 113.8% |
| Example 3 | 110.6% |
| Example 4 | 112.2% |
| Example 5 | 101.1% |
| Example 6 | 131.1% |
| Comparative Example 1 | 158% |
| Comparative Example 2 | 94.8% |
| Comparative Example 3 | 134.3% |

Since charging is performed up to a high voltage of 4.6 V in the activation process, a reactive oxygen compound is generated in the positive electrode, and the reactive oxygen compound reacts with the electrolyte solution to generate gases such as CO and $CO_2$. The more the reactive oxygen compounds, the more the gas generation amount, and as a result, the cell volume increases. Therefore, a small increase in cell volume means a small amount of reactive oxygen compounds.

Table 2 shows that the cell volume increase rate before and after the activation process of the lithium secondary batteries of Examples 1 to 6 using the non-aqueous electrolyte containing the compound of Formula 1 and FEC was significantly lower, compared to that of the lithium secondary battery of Comparative Example 1 using the non-aqueous electrolyte containing FEC without compound of [Chemical Formula 1] and the lithium secondary battery of Comparative Example 3 using the non-aqueous electrolyte containing compound of [Chemical Formula A] instead of compound of [Chemical Formula 1]. This is because the compound of Formula 1 decomposes before FEC in the activation process to form a positive electrode film, thereby suppressing gas generation due to FEC decomposition and suppressing gas generation due to organic solvent decomposition by capturing active oxygen generated in the activation process.

On the other hand, in the case of the lithium secondary battery of Comparative Example 2 using a non-aqueous electrolyte containing the compound of Formula 1 but not containing FEC, the cell volume increase rate before and after the activation process was remarkably low. It is believed that this is because there is no gas generation due to FEC decomposition. However, the lithium secondary battery of Comparative Example 2 has a remarkably low capacity retention rate after high-temperature storage, as described in Experimental Example 2 below.

Experimental Example 2

Each of the lithium secondary batteries prepared by Example 1~6 and Comparative Examples 1~3 was activated in the same manner as in Experimental Example 1, and then fully charged to SOC 100% at 4.35 V under CC/CV and 0.33 C conditions at 25° C. Then, each fully-charged lithium secondary batteries was stored for 8 weeks at 60° C., and then the cell volume increase rate and capacity retention rate were measured.

At this time, the capacity retention rate was calculated by substituting the discharge capacity of the lithium secondary battery measured before high-temperature storage and the discharge capacity of the lithium secondary battery measured after high-temperature storage into Equation (2) below.

Capacity retention rate (%)=(discharge capacity after high-temperature storage/discharge capacity before high-temperature storage)×100   Equation (2)

The cell volume change rate was calculated by substituting the initial volume before the high-temperature storage and the volume after the high-temperature storage into Equation (3) below.

Cell volume change rate (%)={(volume after high-temperature storage−initial volume)/initial volume}×100   Equation (3)

The measurement results are shown in [Table 3] below.

TABLE 3

| | Volume increase rate (%) | Capacity retention rate (%) |
|---|---|---|
| Example 1 | 11.4 | 81.3 |
| Example 2 | 10.2 | 81.8 |
| Example 3 | 9.6 | 80.2 |
| Example 4 | 11.8 | 79.6 |
| Example 5 | 9.7 | 81.1 |
| Example 6 | 13.6 | 82.4 |
| Comparative Example 1 | 14.0 | 78.8 |
| Comparative Example 2 | 8.8 | 77.5 |
| Comparative Example 3 | 12.2 | 79.2 |

Through [Table 3], the capacity retention rates of the lithium secondary batteries of Examples 1 to 6 using the non-aqueous electrolyte containing the compound of Formula 1 and FEC after high-temperature storage were superior to those of the lithium secondary batteries of Comparative Examples 1 to 3. It seems that this is because the oxidation reaction in positive electrode is inhibited by the compound of Formula 1, resulting in an increase in resistance and suppression of electrolyte decomposition due to excessive decomposition of FEC. On the other hand, in the case of the lithium secondary battery of Comparative Example 2 applying a non-aqueous electrolyte containing FEC, the cell volume increase rate was low because no gas was generated due to FEC decomposition, but the capacity retention rate after high temperature storage was the lowest. It seems that this is because the SEI film of positive electrode was not firmly formed due to the absence of FEC, and deterioration of the positive electrode occurs rapidly after storage at high temperature.

Experimental Example 3

A pre-aging step of storing each of the lithium secondary batteries prepared by Comparative Examples 4 and 5 at room temperature for 2 days was performed such that the electrolyte was sufficiently wetted. Then, the lithium secondary batteries were charged up to SOC 30% with 0.1 C at room temperature, then, performed aging at room temperature for 24 hours and high-temperature aging at 60° C. for 24 hours to be stable film and performed gas discharge processes.

Next, charging was performed to 4.2 V with 0.33 C and then discharging was performed to 2.5 V with 0.33 V to complete the activation process.

The cell volumes of the lithium secondary battery before and after the activation process were in the same manner as in Experimental Example 1. The measurement results are shown in [Table 4] below.

In addition, the lithium secondary battery activated by the above method was fully charged up to 100% SOC at 4.2V under CC/CV with 0.33 C at 25° C. Then, the fully charged lithium secondary battery was stored at 60° C. for 8 weeks, and the cell volume increase rate and capacity retention rate were measured after high temperature storage in the same manner as in Experimental Example 2. The measurement results are shown in [Table 4] below.

TABLE 4

| | Cell volume increase rate before and after activation process | Volume increase rate after high temperature storage (%) | Capacity retention rate after high temperature storage (%) |
|---|---|---|---|
| Comparative Example 4 | 28.4% | 2.6% | 94.8 |
| Comparative Example 5 | 27.6% | 2.3% | 94.6 |

[Table 4] shows that there is little difference between Comparative Example 4 in which the compound of Formula 1 was not added to the electrolyte and Comparative Example 5 in which the compound of Formula 1 in terms of the cell volume increase rate before and after activation, the volume increase rate after high-temperature storage, and the capacity retention rate. It shows that there is no improvement effect due to the application of the compound of Formula 1 in the lithium secondary battery to which NCM is applied as a cathode active material, unlike a lithium secondary battery to which lithium manganese oxide is applied as a cathode active material.

As in the present disclosure, when an electrolyte including a coumarin-based compound of Chemical Formula 1 and a halogen-substituted carbonate-based compound is applied to a lithium secondary battery in which a lithium manganese oxide requiring a high-voltage activation process of 4.6 V or greater is applied as a positive electrode active material, excellent effects may be obtained in terms of lifespan properties improvement, gas reduction, and resistance reduction.

When an electrolyte includes a halogen-substituted carbonate-based compound, oxidation stability of the electrolyte increases, and a robust SEI film is formed on the surface of a positive electrode, so that effects of improving high-voltage properties and lifespan properties may be obtained. However, when the halogen-substituted carbonate-based compound is used alone, an oxidation decomposition reaction occurs excessively at a positive electrode interface, resulting in increasing resistance due to the deposition of a LiF component and the like on the surface of the positive electrode, and $CO_2$ gas generation and HF generation side reactions are increased, which may cause a side effect of accelerating an electrolyte decomposition reaction. However, as in the present disclosure, when a halogen-substituted carbonate-based compound and a coumarin-based compound are used together, due to a positive electrode film formation mechanism of the coumarin-based compound, a positive electrode oxidation reaction of the halogen-substituted carbonate-based compound is suppressed, so that the above side effect may be reduced to a minimum.

In addition, since the coumarin-based compound of [Chemical Formula 1] above has higher reaction energy with active oxygen than an organic solvent such as ethylene carbonate, when an electrolyte includes the coumarin-based compound of [Chemical Formula 1], active oxygen generated in a high-voltage activation process is bonded to and scavenged by the coumarin-based compound of Chemical Formula 1 before an organic solvent, and accordingly, decomposition of the organic solvent due to the active oxygen is suppressed. Therefore, the generation of gases or the generation of resistor byproducts caused by the decomposition of the organic solvent due to the active oxygen may be reduced to a minimum.

In addition, since an acetyl group included in the coumarin-based compound of Chemical Formula 1 reacts with the surface of a positive electrode and/or a negative electrode, thereby forming an SEI film, direct contact between the electrode and an electrolyte solution may be suppressed to obtain effects of reducing gas generation and swelling at high temperatures and improving lifespan.

What is claimed is:

1. A lithium secondary battery comprising:

a positive electrode including a positive electrode active material; a negative electrode including a negative electrode active material; and a non-aqueous electrolyte, wherein:

the non-aqueous electrolyte includes an organic solvent, a lithium salt, a coumarin-based compound represented by [Chemical Formula 1] below, and a halogen-substituted cyclic carbonate; and the positive electrode active material includes a lithium manganese-rich oxide represented by [Chemical Formula 2] below:

[Chemical Formula 1]

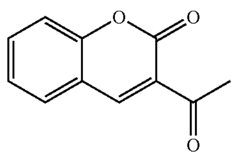

$Li_{1+a}[Ni_bCo_cMn_dM^1_e]O_{2+a}$ [Chemical Formula 2]

wherein in Chemical Formula 2 above, $0.05 \leq a \leq 1$, $0 \leq b \leq 0.5$, $0 \leq c \leq 0.3$, $0.5 \leq d < 1.0$, and $0 \leq e \leq 0.2$, and $M^1$ is at least one selected from the group consisting of metal ions of Al, B, Co, W, Mg, V, Ti, Zn, Ga, In, Ru, Nb, Sn, Sr, and Zr, wherein the coumarin-based compound represented by [Chemical Formula 1] above is included in an amount of 0.5 wt % to 3 wt % based on the total weight of the non-aqueous electrolyte, and the halogen-substituted cyclic carbonate is included in an amount of 0.5 wt % to 10 wt % based on the total weight of the non-aqueous electrolyte.

2. The lithium secondary battery of claim 1, wherein the weight ratio of the courmarin-based compound by represented by [Chemical Formula 1]: the halogen-substituted cyclic carbonate is 1:1~3.

3. The lithium secondary battery of claim 1, wherein the halogen-substituted cyclic carbonate is at least one selected from the group consisting of fluorinated ethylene carbonate, trifluoroethoxyethylen carbonate and difluoroethylene carbonate.

4. The lithium secondary battery of claim 1, wherein the non-aqueous electrolyte further comprises one or more additive selected from the group consisting of a cyclic carbonate-based compound, a sultone-based compound, a sulfate-based compound, a phosphate-based compound, a borate-based compound, a benzene-based compound, an amine-based compound, a silane-based compound, and a lithium salt-based compound.

5. The lithium secondary battery of claim 1, wherein the lithium manganese-rich oxide is represented by [Chemical Formula 2-1] below:

$X\ Li_2MnO_3 \cdot (1-X)Li[Ni_{1-y-z-w}Mn_yCo_zM^1_w]O_2$ [Chemical Formula 2-1]

wherein in [Chemical Formula 2-1] above, $0.1 \leq X \leq 0.5$, $0.5 \leq y < 1$, $0 \leq z \leq 0.3$, and $0 \leq w \leq 0.2$, and $M^1$ is at least one selected from the group consisting of metal ions of Al, B, Co, W, Mg, V, Ti, Zn, Ga, In, Ru, Nb, Sn, Sr, and Zr.

6. The lithium secondary battery of claim 1, wherein the negative electrode active material comprises a silicon-based negative electrode active material.

7. The lithium secondary battery of claim 6, wherein the silicon-based negative active material is selected from the group consisting of Si, $SiO_m$ (wherein $0 < m \leq 2$), a Si—C composite, an Si-$M^a$ alloy (wherein $M^a$ is one or more selected from the group consisting of Al, Sn, Mg, Cu, Fe, Pb, Zn, Mn, Cr, Ti, and Ni), and a combination thereof.

8. The lithium secondary battery of claim 6, wherein the negative electrode active material further comprises a carbon-based negative electrode active material.

9. The lithium secondary battery of claim 8, wherein the negative electrode active material comprises the silicon-based negative electrode active material: the carbon-based negative electrode active material at a weight ratio of 1:99 to 50:50.

* * * * *